United States Patent

Shingaki et al.

[11] Patent Number: 5,257,123
[45] Date of Patent: Oct. 26, 1993

[54] FERROELECTRIC LIQUID CRYSTAL DEVICE WITH TEMPERATURE COMPENSATION BY ROTATION OF COMPENSATOR

[75] Inventors: Junko Shingaki, Atsugi; Hideaki Mitsutake, Tokyo, both of Japan

[73] Assignee: Canon Kabushiki Kaisha, Tokyo, Japan

[21] Appl. No.: 795,047

[22] Filed: Nov. 20, 1991

[30] Foreign Application Priority Data

Nov. 21, 1990 [JP] Japan .................. 2-314245

[51] Int. Cl.⁵ .................. G02F 1/13; G02F 1/133; G02F 1/1335
[52] U.S. Cl. .................. 359/86; 359/73; 359/43
[58] Field of Search .................. 359/40, 41, 86, 63, 359/73, 91, 53

[56] References Cited

U.S. PATENT DOCUMENTS

| | | |
|---|---|---|
| 4,413,915 | 11/1983 | Besson .................. 359/53 X |
| 4,711,530 | 12/1987 | Nakanowatari et al. .................. 359/73 X |
| 4,838,663 | 6/1989 | Lagerwall et al. .................. 359/73 X |

FOREIGN PATENT DOCUMENTS

| | | |
|---|---|---|
| 62-204229 | 9/1987 | Japan . |
| 0247333 | 11/1987 | Japan . |
| 0202717 | 8/1988 | Japan . |
| 1-219821 | 9/1989 | Japan . |
| 0271729 | 10/1989 | Japan . |
| 2-000828 | 1/1990 | Japan . |
| 0144518 | 6/1990 | Japan . |
| 0308219 | 12/1990 | Japan . |
| 0118513 | 5/1991 | Japan . |

OTHER PUBLICATIONS

Noel A. Clark, et al., "Submicrosecond Bistable Electro-Optic Switching in Liquid Crystals," Applied Physics Letter, vol. 36, No. 11, pp. 899-901 (Jun. 1980).

*Primary Examiner*—William L. Sikes
*Assistant Examiner*—Kenneth Parker
*Attorney, Agent, or Firm*—Fitzpatrick, Cella, Harper & Scinto

[57] ABSTRACT

An optical modulating device comprises a polarizer, an analyzer and liquid crystals positioned between the polarizer and the analyzer. The device controls the birefringence of the liquid crystals by applying an electric field to the liquid crystals so as to change the polarization of light of the device. The device further comprises a rotatable halfwave plate which is positioned between the liquid crystals and the analyzer or between the liquid crystals and the polarizer in such a manner that the optical axis of the halfwave plate will be rotated around the optical axis of light coming into the optical modulating device. The device varies the rotational angle of the halfwave plate in accordance with the temperature of the liquid crystals or the environment thereof.

2 Claims, 4 Drawing Sheets

FERROELECTRIC LIQUID CRYSTAL DEVICE WITH TEMPERATURE COMPENSATION BY ROTATION OF COMPENSATOR

BACKGROUND OF THE INVENTION

1. Field of the Invention

The present invention relates to an optical modulating device employing a material having an anisotropy of refractive index, and particularly, to an optical modulating device employing ferroelectric liquid crystals (referred to as "FLC" hereinafter) showing the anisotropy of refractive index. Such an optical modulating device is preferably used in a display apparatus which displays letters, characters or images.

2. Related Background Art

One mode of an optical modulating device (SSFLC) in which a ferroelectric liquid crystal layer is formed in a narrow gap (e.g. 1 to 2 μm) between a pair of parallel boards and in which the surface effect of the boards provides bistability for the FLC (described in Appl. Phys. Lett. Vol. 36, No. 11 (1980) pp. 889-901) was expected to provide a wide range of application because of its quick response and memory effect.

The bistable FLC device shows two stable states in directions shifted a certain angle both ways from the axis direction (rubbing direction or the like) of the aligning surface, which is formed by a rubbing method or the like on the liquid-crystal-side surfaces of boards positioned on both sides of the liquid crystal layer. The tilt angle is called a cone angle (hereinafter referred to by $\theta c$). When voltage is applied perpendicularly to the liquid crystal layer of the FLC device, the FLCs shift from one stable state to the other. This shift corresponds to the $2\theta c$ rotation on a plane of the FLC layer of the principal axis of index ellipsoid of a material having anisotropy of refraction index. Although, strictly speaking, the main axis of the index ellipsoid does not always coincide with an axis of the liquid crystal molecules, it is supposed that the two axes are in the same direction, to simplify the description. Therefore, when polarized light comes into a bistable FLC device having a thickness corresponding to the operation of a halfwave plate, the rotating effect of polarization to the incoming polarized light in one of the two stable states is $4\theta c$ different from that in the other. When such a bistable FLC device is placed between polarizers (such as polarizing plates) positioned in crossed nicols or parallel nicols, an ON/OFF ratio of transmitted-light quantity, i.e., transmittance ratio, contrast, between the two stable states reaches a maximum if $$4\theta c = 90° \ (\theta c = 22.5°).$$

FIG. 4 illustrates an FLC device having polarizing elements positioned in crossed nicols. In the figure, incident light Ein goes through a polarizer 1 to become polarized light E1, which goes into an FLC layer 2 having an effect equivalent to that of a halfwave plate. The direction of the polarization of the incident light E1 is the same as that of the axis 45 of the FLC molecules in one of the two stable states. An analyzer 3 is positioned perpendicular to the polarizer 1. Another FLC molecule axis 46 is that of the other stable state. The molecule axes 45 and 46 have cone angles of $+\theta c$ and $-\theta c$, respectively, to an aligning axis 44, for example, determined by the rubbing method. When the FLC molecules are in one stable state 45, the polarized light is not rotated by the FLC layer 2 and is thus entirely blocked by analyzer 3. Black is thus expressed. When the FLC molecules are in the other stable state 46, the polarized light is rotated $4\theta c$ by the FLC layer 2, and then it is transmitted by the analyzer 3 at a ratio of $$\sin^2(4\theta c).$$

White is thus expressed.

Cone angles $\theta c$ in bistable FLC devices are substantially dependent on temperature. Thus, even if a device is positioned as shown in FIG. 4 at one temperature, the FLC molecule axis 45 in one of the two stable states tilts from the polarization direction of incident light at another temperature because of a change in cone angle. In such a case, the polarized light is rotated by the polarization effect of the FLC layer. Therefore, the contrast degrades because black is not fully expressed in the case where the polarizer 1 and the analyzer 3 are positioned in crossed nicols, or because white is not fully expressed in the case where they are positioned in parallel nicols.

SUMMARY OF THE INVENTION

It is an object of the present invention to solve the above mentioned problems by providing an optical modulating device in which contrast degradation is substantially reduced.

In order to achieve the object, the present invention provides an optical modulating device which comprises a polarizer, an analyzer, and liquid crystals positioned between the polarizer and the analyzer, and which controls the birefringence of the liquid crystal by applying an electric field to the liquid crystals so as to change the polarization of light of the device, and which further comprises a rotatable halfwave plate being positioned between the liquid crystals and the analyzer or between the liquid crystals and the polarizer in such a manner that the optical axis of the halfwave plate will be rotated around the optical axis of a display apparatus employing the optical modulating device, and wherein the rotational angle of the halfwave plate is varied in accordance with the temperature of the liquid crystals or the environment thereof, and particularly such angles have one-to-one correspondence to such temperature.

In the construction as described above, when a proper corresponding relation is set between the rotational angle of the halfwave plate and the temperature of the liquid crystals or its environment, the display conditions in one of the two stable states of the liquid crystals are not affected by a change in cone angles caused by the temperature change. In other words, a constant transmittance can be maintained.

Ferroelectric liquid crystals (FLCs) may be used as the liquid crystals.

An optical modulating device according to the present invention may have one of two main constructions. In the first construction, the transmission axes of the polarizer and the analyzer are perpendicular to each other, and the transmission axis of the polarizer is parallel to the FLC molecule axes in one of the two stable states of the FLCs. In the second construction, the transmission axes of the polarizer and the analyzer are parallel to each other, and as in the first construction, the transmission axis of the polarizer is parallel to the FLC molecule axes in one of the two stable states of the FLCs. In either construction, in one of the two stable states, the effect which a cone angle of the FLCs shifted by a temperature change has onto the polarization of the incoming light is cancelled by the polarization effect provided by the accordingly tilted halfwave plate, and thus the direction in which incident light is polarized is not rotated, in total, by the polarization. Thus, in one of the two stable states of the FLCs, complete black or complete white can be expressed in spite of the temperature change, so that images with a high contrast can be displayed.

DETAILED DESCRIPTION OF THE PREFERRED EMBODIMENTS

Embodiments of the present invention will be described hereinafter with reference to the figures.

[Embodiment 1]

Figure 1:
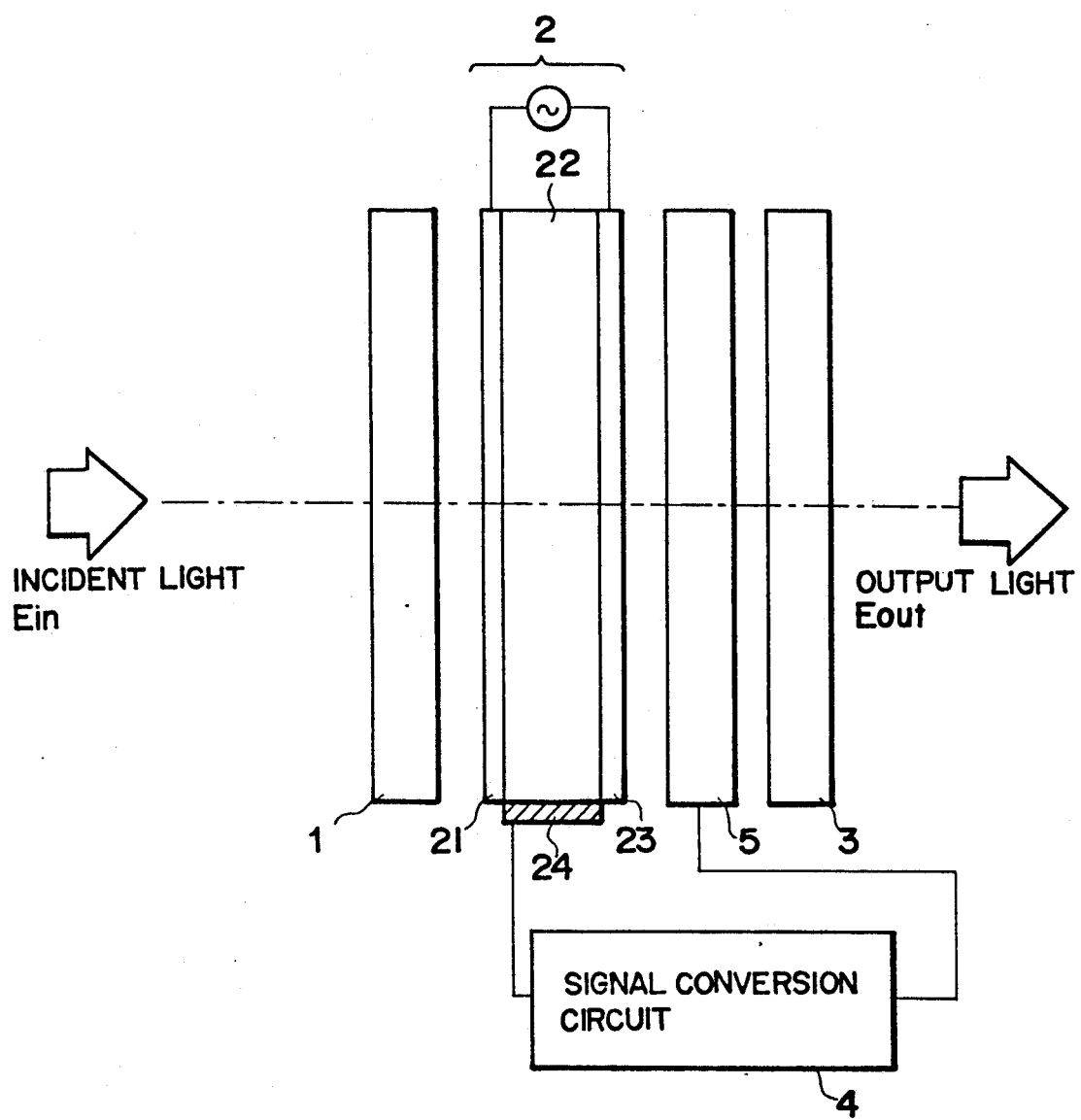
FIG. 1 is a schematic sectional view of an optical modulating device according to an embodiment of the present invention.

With reference to FIG. 1, a polarizer 1 linearly polarizes incident natural light. An FLC layer 2 controls the state of polarization of incoming linearly polarized light (modulates the light) in accordance with an applied voltage. An analyzer 3 transmits only a component of the light modulated by the FLC layer 2, such component having a specified direction. A signal conversion circuit 4 includes a ROM storing a table in which rotational angles correspond to temperatures. A halfwave plate 5 is rotatable. The FLC layer 2 is composed of a pair of transparent base boards 21 and 23 facing each other, an FLC molecule layer 22 provided between the base boards 21 and 23, and a temperature detector 24 of the FLC molecule layer 22.

Incident light is linearly polarized by the polarizer 1 and then is modulated by FLC 2. After the modulated light goes through the halfwave plate 5, it goes into the analyzer 3, which transmits only a component light in the transmission direction thereof. The FLC molecule layer 22 exhibits one of the two stable states according to the direction of the electric field applied thereto by transparent electrodes (not shown) formed on the insides of the base board 21 and 23.

The temperature detector 24 detects the temperature of the FLC molecule layer 22 and its environment. The temperature values are converted by the signal conversion circuit 4 into signals which control the rotation of the halfwave plate 5.

Figure 2:
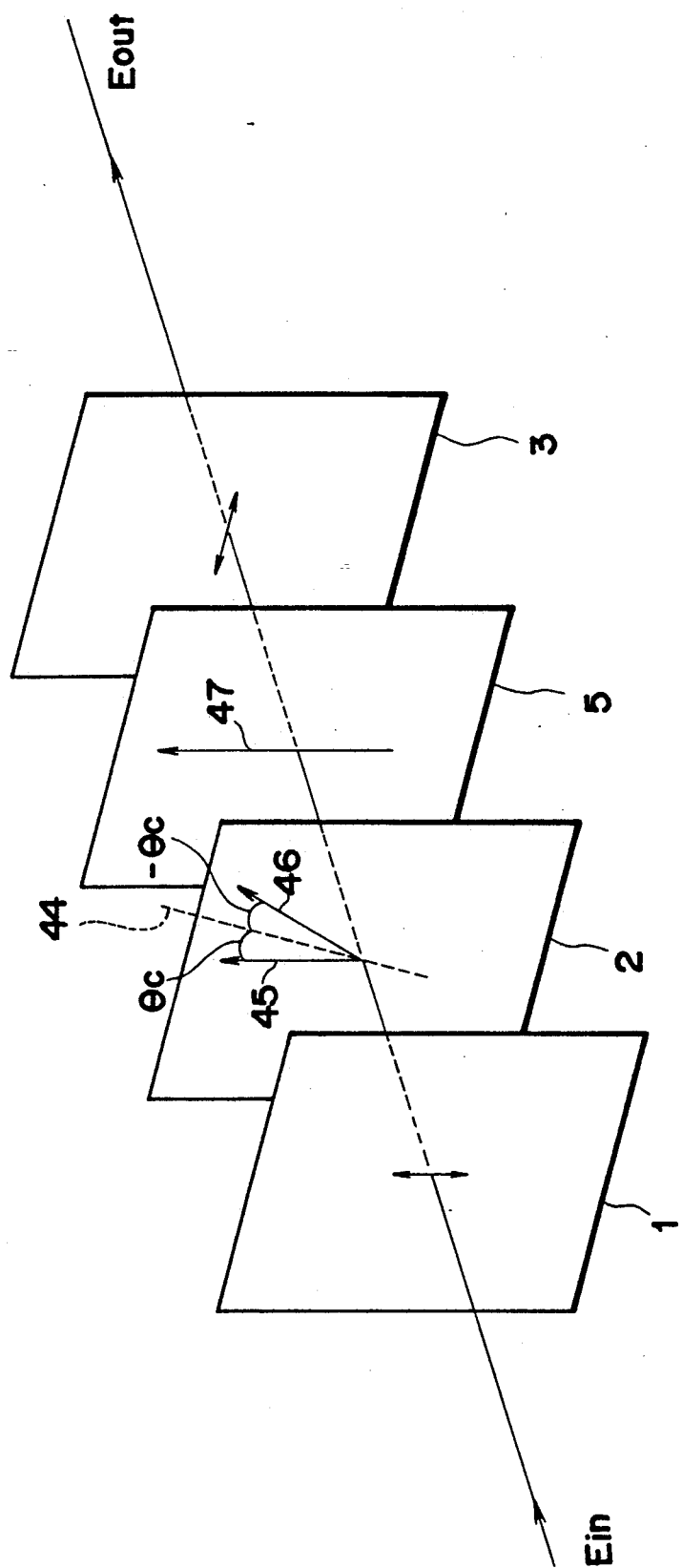
FIG. 2 is a schematic perspective view of the optical modulating device shown in FIG. 1, illustrating the state of each layer thereof at a standard temperature.
Figure 3:
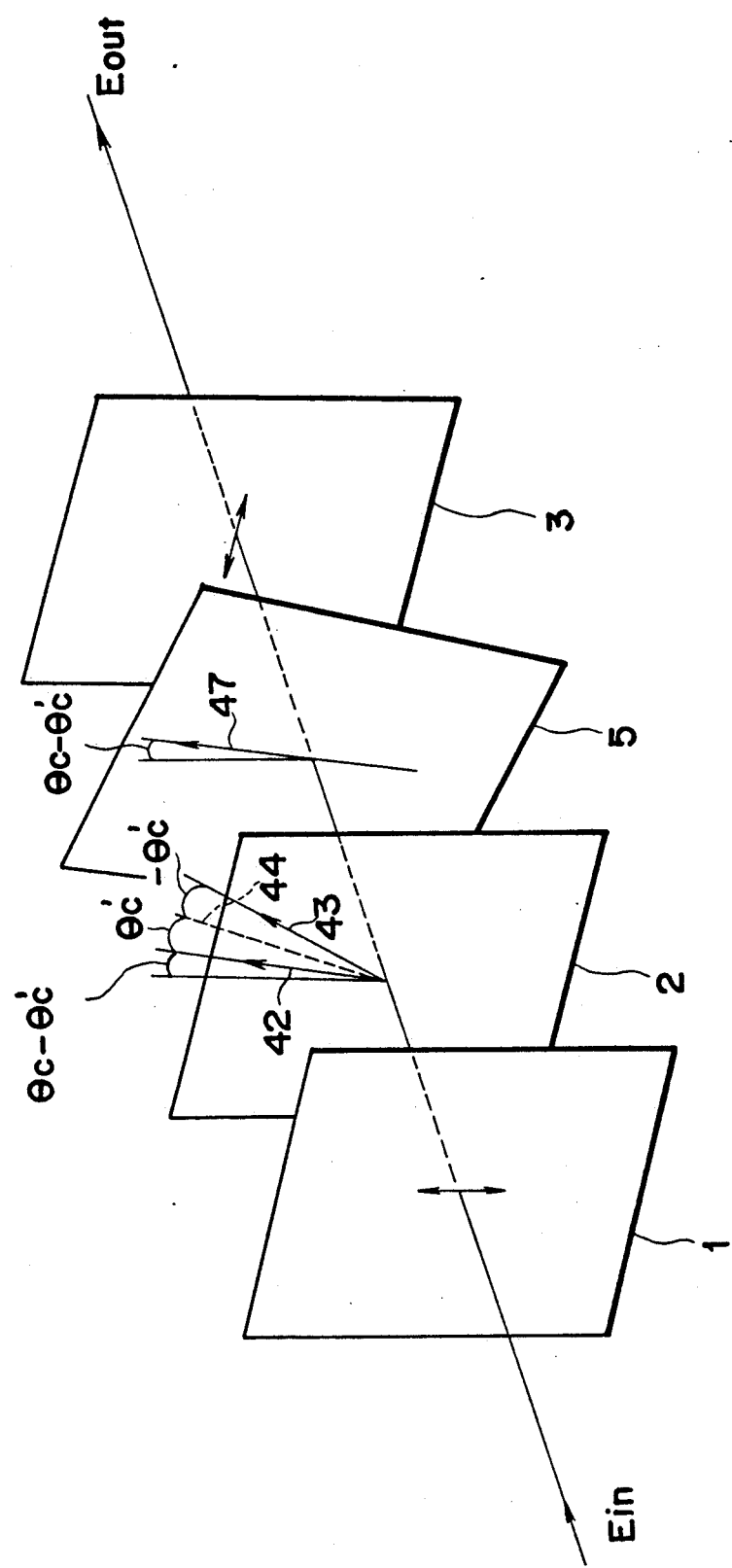
FIG. 3 is a schematic perspective view of the optical modulating device shown in FIG. 1, illustrating the state of each layer thereof at a temperature other than the standard temperature.
Figure 4:
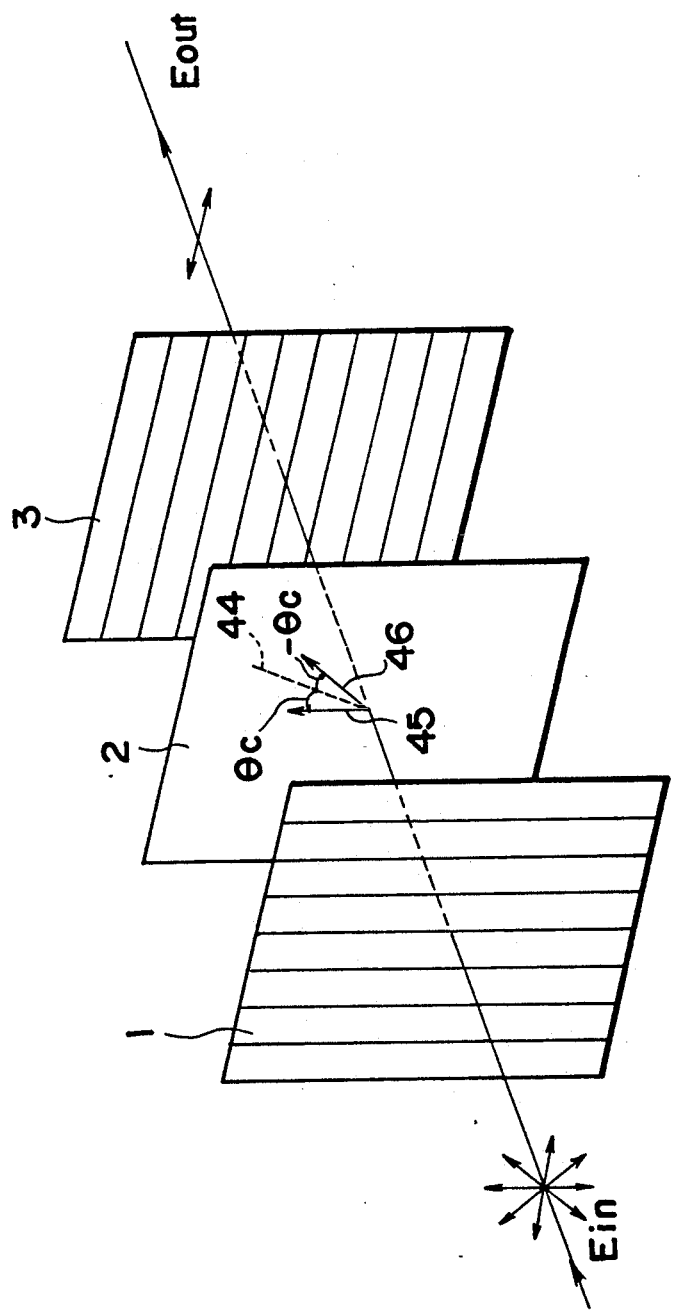
FIG. 4 is a schematic perspective view of a conventional optical modulating device, illustrating the state of each layer thereof.

FIGS. 2 and 3 illustrate the state of each layer of the optical modulating device at different temperatures A and B, respectively. In the figures, 44 denotes an aligning axis for the FLC molecules, and the angles spreading clockwise with respect to the direction in which the light along the optical axis travels are expressed by negative values.

Referring to FIG. 2, FLC molecules axes 45 and 46 in the two stable states are at once angles $+\theta c$ and $-\theta c$ respectively to the aligning axis 44 at the temperature A. Incident unpolarized light Ein is polarized by the polarizer 1, so that the polarized light goes into the FLC layer 2 with the polarization direction of the light being in the direction of the molecule axis 45 at the cone angle $+\theta c$. When no electric field is applied to the FLC layer 2, the FLC molecule axis is in the direction 45. In such a case, the polarized light is not rotated by the polarizing effect of the FLC layer 2, nor by the polarizing effect of the halfwave plate 5, and then is entirely blocked by analyzer 3. Thus, complete black is expressed. When an electric field is applied to the FLC layer, the FLC molecule axis is in the direction 46. In this case, the polarized light is rotated $-4\theta c$ by the FLC layer 2 having an effect equivalent to that of a halfwave plate, and then is rotated $8\theta c$ by the halfwave plate 5. Thus the total polarizing rotation by the FLC layer 2 and the halfwave plate 5 is $4\theta c$. Therefore, as in the conventional art, the light is transmitted by the analyzer at a ratio of $$\sin^2(4\theta c).$$

20 Referring to FIG. 3, when the temperature of the FLC is B, FLC molecule axes 42 and 43 in the two stable states are at cone angles $+\theta c'$ and $-\theta c'$ respectively to the aligning axis 44, and the halfwave plate 5 is rotated $-(\theta c-\theta c')$ from the position thereof at the temperature A shown in FIG. 2. As in the case where the temperature is A, incident unpolarized light is polarized by the polarizer 1, so that the polarized light goes into the FLC layer 2 with the polarization direction of the light being in the direction 45 (shown in FIG. 2), which is at an angle $\theta c$ to the aligning axis 44. When no electric field is applied to the FLC layer 2, the FLC molecule axis is in the direction 42. In such a case, the polarized light is rotated $-2(\theta c-\theta c')$ across the molecule axis 42 by the polarizing effect of the FLC layer, and then is rotated $2(\theta c-\theta c')$, in the opposite direction, by the polarizing effect of the halfwave plate 5, which is rotated $-(\theta c-\theta c')$ as described above. The two polarizing rotations offset each other. Therefore, the light coming out of the halfwave plate is entirely blocked by the analyzer 3. Thus, complete black is expressed. When an electric field is applied to the FLC layer 2, the FLC molecule axis is in the direction 43. The polarized light is rotated $-2(\theta c'+\theta c)$ by the FLC layer 2, and then is rotated $(6\theta c'+2\theta c)$ in the opposite direction by the halfwave plate 5. Thus, the total polarizing rotation becomes $4\theta c'$. The light is transmitted by the analyzer at a ratio of $$\sin^2(4\theta c').$$

As described above, black is expressed in the constant state in spite of the temperature change. Thus, an optical modulating device according to this embodiment provides high-quality images with a high contrast in a wide temperature range.

An element in the signal conversion circuit is not necessarily a ROM but may be another element having functions equivalent to those of the ROM.

[Embodiment 2]

This embodiment differs from the embodiment 1 in that a polarizer 1 and an analyzer 3 are positioned so that the transmission axes thereof are parallel with each other and are parallel with the FLC molecule axis in one of the two stable states.

The incoming polarized light is rotated by the polarizing effect of the FLC layer and the halfwave plate in the same manner as in the embodiment 1. When there is no electric field applied to the FLC layer, the analyzer 3 transmits the polarized light entirely. Thus, complete white is expressed. The direction of the polarization completely coincides with the transmission axis of the analyzer, in spite of the temperature change.

Thus, this embodiment provides an optical modulating device which displays high-quality images with a high contrast in a wide temperature range.

Although the polarizer and the analyzer in the embodiment 1, 2 are perpendicular or parallel to each other respectively, they may be positioned in other manners providing effects similar to those in the embodiments.

[Embodiment 3]

According to this embodiment, the FLC layer 2 and the halfwave plate 5 in the embodiments 1, 2 may be interchanged in position. As in the above embodiments, this embodiment provides an optical modulating device which espresses complete black or complete white, i.e. displays high-quality images with a high contrast, in a wide temperature range.

[Embodiment 4]

According to this embodiment, the rotatable halfwave plate 5 in the above embodiments is substantially a circle which externally touches the four corners of the quadrangular-shaped FLC layer 2, or it is substantially a quadrangle which externally touches such a circle. In this manner, all the light coming out of the FLC layer 2 goes into the halfwave plate 5, or all the light coming out of the halfwave plate 5 goes into the FLC layer 2 in the case where they are positioned as in the embodiment 3.

Although the present invention is applied to an optical modulating device using bistable FLCs in the above description, the present invention may be applied to optical modulating devices which are other types of liquid crystals since such devices have substantially the same problems as described above. In such cases, the present invention will provide substantially the same effect as described above.

Being constructed as described above, an optical modulating device according to the present invention provides a constant contrast or a high transmittance in spite of a change in the temperature of the FLC layer and thus displays high-quality images.

What is claimed is:

1. An optical modulating device which comprises a polarizer, an analyzer, and liquid crystals which an aligning axis positioned between said polarizer and said analyzer, and which controls the birefringence of said liquid crystals by applying an electric field to said liquid crystals so as to change the light polarization direction of said device, said optical modulating device further comprising:

a rotatable halfwave plate which is positioned between said liquid crystals and said analyzer or between said liquid crystals and said polarizer in such a manner that the optical axis of said halfwave plate will be rotated around the optical axis of light coming into said optical modulating device, and the aligning axis of said liquid crystals, wherein rotational angles of said halfwave plate have one-to-one correspondence with a temperature of said liquid crystals or the environment thereof and said liquid crystals comprise ferroelectric liquid crystals.

2. An optical modulating device which comprises a polarizer, an analyzer, and liquid crystals with an aligning axis positioned between said polarizer and said analyzer, and which controls the birefringence of said liquid crystals by applying an electric field to said liquid crystals so as to change the light polarization direction of said device, said optical modulating device further comprising:

a rotatable halfwave plate which is positioned between said liquid crystals and said analyzer or between said liquid crystals and said polarizer in such a manner that the optical axis of said halfwave plate will be rotated around the optical axis of light coming into said optical modulating device, and the aligning axis of said liquid crystals, wherein the rotational angle of said halfwave plate is varied in accordance with the temperature of said liquid crystals or the environment thereof and said liquid crystals comprise ferroelectric liquid crystals.

* * * * *

UNITED STATES PATENT AND TRADEMARK OFFICE
CERTIFICATE OF CORRECTION

PATENT NO. : 5,257,123
DATED : October 26, 1993
INVENTOR(S) : Shingaki et al.

It is certified that error appears in the above-indentified patent and that said Letters Patent is hereby corrected as shown below:

COLUMN 4:

Line 22, "20" should be deleted.

COLUMN 5:

Line 20, "espresses" should read --expresses--.

COLUMN 6:

Line 5, "which" should read --with--.
Line 17, "device," should read --device--.
Line 37, "device," should read --device--.

Signed and Sealed this

Ninth Day of August, 1994

Attest:

BRUCE LEHMAN

Attesting Officer

Commissioner of Patents and Trademarks